(12) United States Patent
Maeda

(10) Patent No.: US 10,662,587 B2
(45) Date of Patent: May 26, 2020

(54) DECORATIVE SHEET AND SEAT

(71) Applicant: SEIREN CO., LTD., Fukui-shi, Fukui (JP)

(72) Inventor: Keiko Maeda, Fukui (JP)

(73) Assignee: SEIREN CO., LTD., Fukui (JP)

( * ) Notice: Subject to any disclaimer, the term of this patent is extended or adjusted under 35 U.S.C. 154(b) by 132 days.

(21) Appl. No.: 16/052,341

(22) Filed: Aug. 1, 2018

(65) Prior Publication Data

US 2019/0040585 A1    Feb. 7, 2019

(30) Foreign Application Priority Data

Aug. 3, 2017 (JP) ................................ 2017-150584

(51) Int. Cl.

| | |
|---|---|
| *D21H 27/20* | (2006.01) |
| *B44F 7/00* | (2006.01) |
| *D06N 3/06* | (2006.01) |
| *B41M 3/18* | (2006.01) |
| *D06N 7/00* | (2006.01) |
| *D21H 19/10* | (2006.01) |
| *D06P 5/20* | (2006.01) |
| *D21H 19/68* | (2006.01) |
| *D06P 5/30* | (2006.01) |
| *D21H 27/02* | (2006.01) |
| *D06N 3/00* | (2006.01) |
| *B32B 5/24* | (2006.01) |
| *A47C 7/24* | (2006.01) |

(52) U.S. Cl.
CPC ............. *D21H 27/20* (2013.01); *A47C 7/24* (2013.01); *B32B 5/24* (2013.01); *B41M 3/18* (2013.01); *B44F 7/00* (2013.01); *D06N 3/0086* (2013.01); *D06N 3/065* (2013.01); *D06N 7/0092* (2013.01); *D06P 5/2011* (2013.01); *D06P 5/30* (2013.01); *D21H 19/10* (2013.01); *D21H 19/68* (2013.01); *D21H 27/02* (2013.01); *D06N 3/0081* (2013.01); *D06N 2203/048* (2013.01); *D06N 2207/123* (2013.01); *D06N 2207/126* (2013.01); *D06N 2209/0807* (2013.01); *D06N 2211/14* (2013.01); *D06N 2211/26* (2013.01); *Y10S 428/904* (2013.01); *Y10T 428/23986* (2015.04); *Y10T 428/24438* (2015.01)

(58) Field of Classification Search
CPC ......... Y10S 428/904; Y10T 428/23986; Y10T 428/24438; B32B 5/24; A47C 7/24
USPC ....................................................... 428/195.1
See application file for complete search history.

(56) References Cited

U.S. PATENT DOCUMENTS

| | | | |
|---|---|---|---|
| 2002/0022106 A1* | 2/2002 | Sasa ........................ | B32B 27/30 428/96 |
| 2008/0132865 A1 | 6/2008 | Li | |
| 2019/0040585 A1* | 2/2019 | Maeda ................. | D06N 7/0092 |

FOREIGN PATENT DOCUMENTS

JP        2010510861 A      4/2010

* cited by examiner

*Primary Examiner* — Betelhem Shewareged
(74) *Attorney, Agent, or Firm* — Rankin, Hill & Clark LLP

(57) ABSTRACT

A decorative sheet includes a fiber base material and a first pattern. The first pattern decorates a surface of the fiber base material. The first pattern is formed by a resin portion made of resin. The resin portion adheres to the surface of the fiber base material. In the first pattern, a height of the resin portion from the surface of the fiber base material changes on the surface of the fiber base material.

20 Claims, 13 Drawing Sheets

DECORATIVE SHEET AND SEAT

CROSS-REFERENCE TO RELATED APPLICATION

This application claims priority from Japanese Patent Application No. 2017-150584 filed on Aug. 3, 2017. The entire content of the priority application is incorporated herein by reference.

BACKGROUND

1. Technical Field

The present disclosure relates to a decorative sheet including a pattern decorating a surface of a fiber base material, and a seat.

2. Related Art

A technology related to the decoration of a base material has been proposed. For example, JP-T-2010-510861 discloses a base material printed with a pattern that gives a three-dimensional appearance. The base material is a nonwoven web or nonwoven fabric, a plastic film, and a laminate of them. The pattern is a repeated pattern. The repeated pattern includes at least approximately 10 macro units having substantially the same overall shape. The pattern is formed by printing on a surface of the base material. Inkjet printing is used for the printing. Each macro unit has three or more color zones at different contrast levels. The color zone transitions from darkest to brightest. One color zone is defined by a background color of the base material. The remaining portion of the color zones is printed. A bright area gives an appearance that reflects light intensely from a raised area projecting from the surface of the base material. A dark area gives an appearance that the raised area casts a shadow over another area of the base material.

SUMMARY

According to one aspect, this specification discloses a decorative sheet including a fiber base material, and a first pattern decorating a surface of the fiber base material, wherein the first pattern is formed by a resin portion made of resin adhering to the surface of the fiber base material, and in the first pattern, a height of the resin portion from the surface of the fiber base material changes on the surface of the fiber base material.

DESCRIPTION OF EMBODIMENTS

Figure 1:
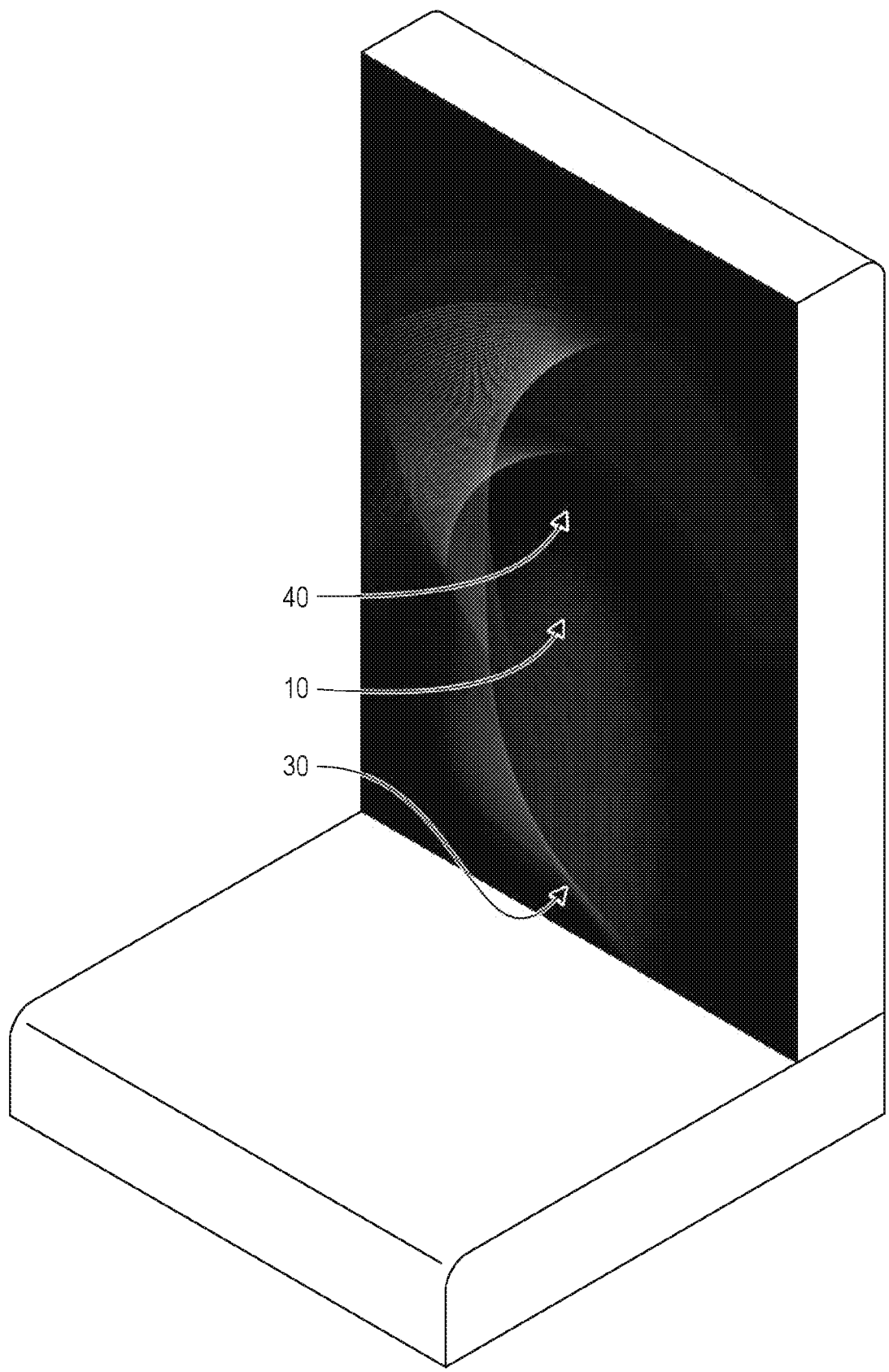
FIG. 1 is a perspective view indicating an example of a schematic configuration of a seat.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Decorative sheets are provided on surfaces of various products. The decorative sheets are used for front fabrics of various products. The decorative sheet includes a pattern for decoration on a surface of a fiber base material. The decorative sheet can improve a design of a product. The inventor has studied a decoration technology that can improve the design of the product.

In view of the foregoing, it is an object of the present disclosure to provide a decorative sheet that can improve a design of a product, and a seat with a good design.

A decorative sheet according to one aspect of the present disclosure includes a fiber base material, and a first pattern decorating a surface of the fiber base material, wherein the first pattern is formed by a resin portion made of resin adhering to the surface of the fiber base material, and in the first pattern, a height of the resin portion from the surface of the fiber base material changes on the surface of the fiber base material.

According to the decorative sheet, the texture of the decorative sheet can be improved. A three-dimensional effect can be added to the decorative sheet. It is possible to cause a viewer of the decorative sheet to feel successive changes in the first pattern with the sense of sight and the sense of touch. It is possible to increase the degree of freedom in a design of a product having the decorative sheet as a front fabric. The design of the product can be improved.

A seat according to another aspect of the present disclosure has the above-described decorative sheet as a front fabric. According to the seat, it is possible to have a seat exerting the above-described function. It is possible to have a seat with a good design.

A seat according to still another aspect of the present disclosure includes a fiber base material, a first pattern decorating a surface of the fiber base material, and a second pattern decorating the surface of the fiber base material, wherein the first pattern is formed by a resin portion made of resin adhering to the surface of the fiber base material, the second pattern includes a gradation that changes successively in part or all of lightness, hue, and chroma, and in the first pattern, a height of the resin portion from the surface of the fiber base material changes on the surface of the fiber base material.

According to the seat, the texture of the seat can be improved. A three-dimensional effect can be added to the seat. A three-dimensional effect can be expressed with the two different first and second patterns. It is possible to cause a viewer of the seat to feel successive changes in the first pattern with the sense of sight and the sense of touch. The seat can increase the degree of freedom in a design and increase a design variation. It is possible to have a seat with a good design.

Embodiments for carrying out the present disclosure will be described with reference to the drawings. The present disclosure is not limited to the configurations described below, and various configurations can be employed based on the same technical idea. For example, a part of the configurations shown below may be omitted or may be replaced by another configuration or the like. Another configuration may be included.

<Decorative Sheet>

A decorative sheet 10 is described with reference to FIGS. 1 to 4. The decorative sheet 10 is provided on a surface of a predetermined product. For example, the decorative sheet 10 is used as a front fabric of the predetermined product. A seat is illustrated by example as the previously-described product (refer to FIG. 1). The seat includes a seat provided to transport equipment. The seat includes, for example, a car seat. Furthermore, the seat includes a sofa and a chair. The decorative sheet 10 may be a front fabric of a product other than each of the previously-described products. In addition, the decorative sheet 10 is used as a material of covers and the like. The covers and the like cover the predetermined products. A seat cover is illustrated by example as the covers and the like. The seat cover is mounted on a seat. Furthermore, the decorative sheet 10 can also be used as, for example, various interior materials, floor materials, construction materials, bag materials, shoe materials, or clothing materials. An interior material for a vehicle or construction is illustrated by example as the previously-described interior material. A ceiling material, a door material, or a floor material is illustrated by example as the interior material for a vehicle. Wallpaper is illustrated by example as the interior material for construction. The wallpaper is affixed to an interior wall or ceiling of a building. An external wall material, in addition to the previously-described interior material for construction, is illustrated by example as the construction material.

Figure 2:
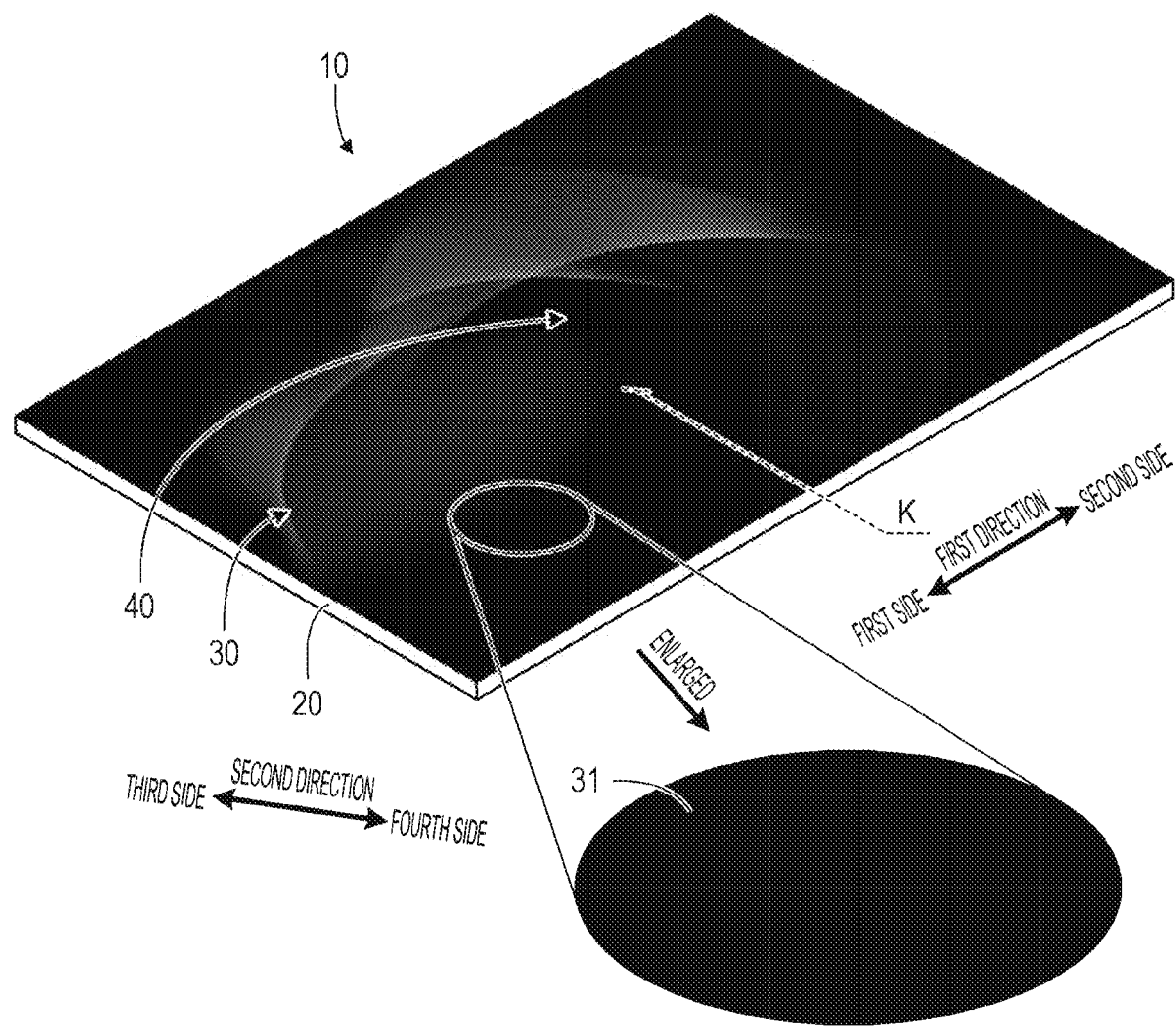
FIG. 2 is a perspective view indicating an example of a schematic configuration of a decorative sheet, and indicates a partial enlarged view of a first pattern.
Figure 3:
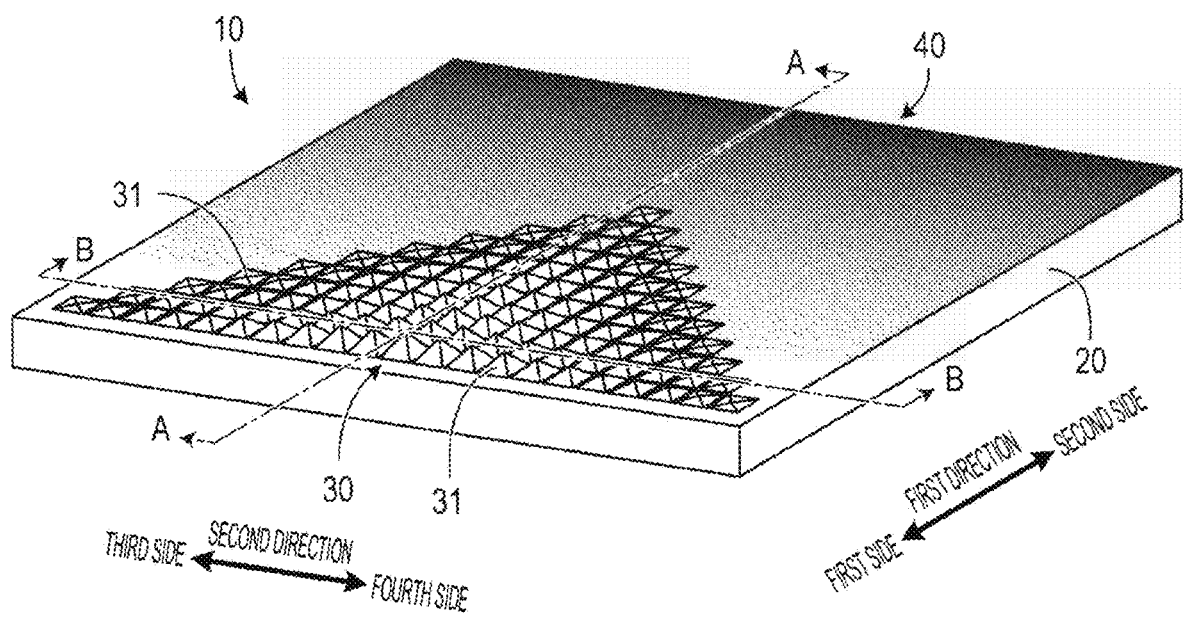
FIG. 3 is a perspective view schematically indicating another example of a schematic configuration of a decorative sheet.

The decorative sheet 10 includes a fiber base material 20, a first pattern 30, and a second pattern 40 (refer to FIGS. 2 and 3). The seat illustrated by example in FIG. 1 employs the decorative sheet 10 indicated in FIG. 2 as a front fabric of a back portion. However, the decorative sheet 10 may be employed for a portion of a seat different from FIG. 1. The decorative sheet 10 can also be employed as, for example, a front fabric of a seating surface. In addition, the decorative sheet 10 can also be employed as front fabrics of the back and the seating surface. Furthermore, the decorative sheet 10 may be employed for the entire seat. In FIG. 1, the illustration of a portion other than the back is omitted in terms of a front fabric of the seat. The fiber base material 20 is a sheet-shaped base material containing fiber, a surface of the base material being covered with synthetic resin. More specifically, in the embodiment, the decorative sheet 10 is a fibrous sheet material that will be used as a front fabric of the predetermined product, or a fibrous sheet material that is being used as a front fabric of the predetermined product. If the decorative sheet 10 is the front fabric of the above-described seat, or is used as a material of the above-described predetermined product, or as the predetermined product, for example, leather is employed as the fiber base material 20. The leather includes synthetic leather, artificial leather, polyvinyl chloride leather, and natural leather. A predetermined material is appropriately selected as the fiber base material 20 according to the product. In this case, a fibrous base material whose surface is not covered with synthetic resin may be selected as the fiber base material 20. Cloth is illustrated by example as such a fiber base material 20. The cloth includes, for example, a textile, a knitted fabric, and a nonwoven fabric. Furthermore, the fiber base material 20 may be, for example, a paper base material or a base material containing paper. If the fiber base material 20 is the base material containing paper, a surface of the paper may be covered with synthetic resin. The surface of the fiber base material 20 is set in a predetermined color. Taking, for example, the decorative sheet 10 having the black background as an example, the fiber base material 20 may be a fiber base material having a black surface. The surface color of the fiber base material 20 is determined as appropriate, considering various conditions.

The first pattern 30 and the second pattern 40 are both patterns that decorate a surface of the fiber base material 20 (refer to FIGS. 2 and 3). The first pattern 30 and the second pattern 40 are formed on the surface of the fiber base material 20. For example, a recording method is used to form the first pattern 30 and the second pattern 40 on the surface of the fiber base material 20. More specifically, the first pattern 30 and the second pattern 40 are recorded onto the surface of the fiber base material 20. According to the recording method, a full-color pattern can be recorded onto the surface of the fiber base material 20. The recording method is carried out with, for example, an inkjet recording apparatus. The recording method with the inkjet recording apparatus is described below.

The first pattern 30 is formed by a resin portion 31 made of resin (refer to FIGS. 2 and 3). The resin portion 31 adheres to the surface of the fiber base material 20. The first pattern 30 includes an area where a height H of the resin portion 31 from the surface of the fiber base material 20 changes. The resin portion 31 of the decorative sheet 10 includes a plurality of projections 31 made of resin. More specifically, the first pattern 30 of the decorative sheet 10 is formed by the plurality of projections 31 as the resin portion 31. The plurality of projections 31 adheres to the surface of the fiber base material 20. The plurality of projections 31 includes a plurality of types of projections having different heights H from the surface of the fiber base material 20. In the embodiment, a description is given taking, as an example, the first pattern 30 with the plurality of projections 31, with the resin portion 31 as the plurality of projections 31. A square pyramid projection is illustrated by example as the projection 31. The plurality of projections 31 is one embodiment of the resin portion 31. Therefore, the same reference numeral "31" is assigned to the resin portion 31 and the projection 31.

Figure 4:
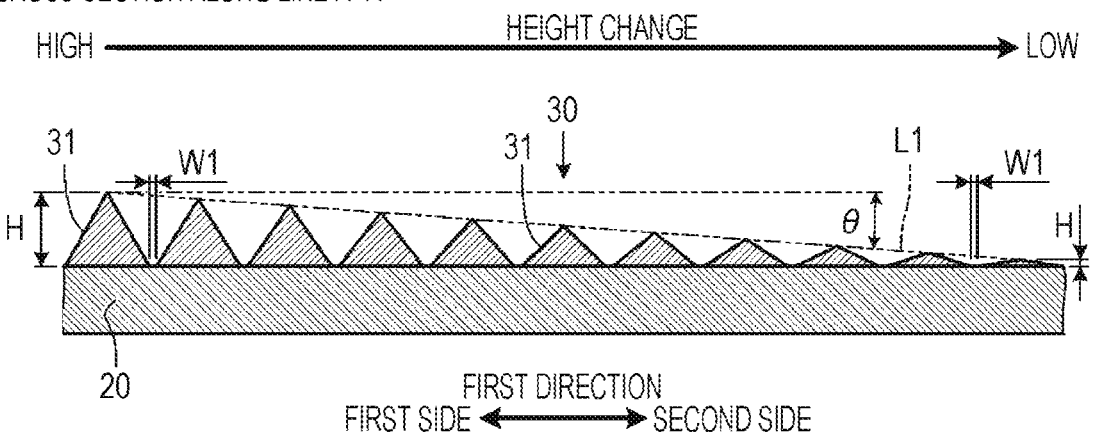
FIG. 4 is a diagram indicating the state of changing each height of a plurality of projections, in which the upper row is a partial cross-sectional view taken along line A-A indicated in FIG. 3, the middle and lower rows are partial cross-sectional views taken along line B-B indicated in FIG. 3, an area indicated in the middle row is from the center to a third side in a second direction, and an area indicated in the lower row is from the center to a fourth side in the second direction.
Figure 4:
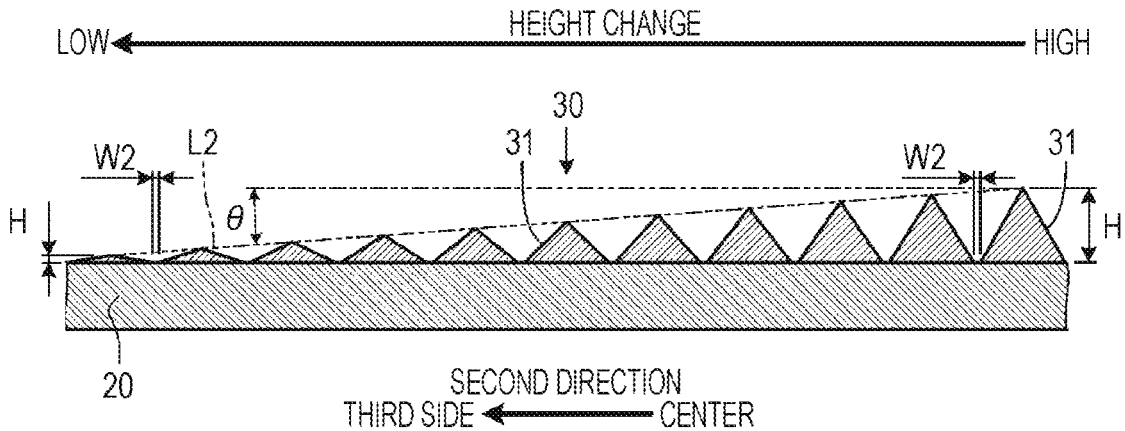
Figure 4:
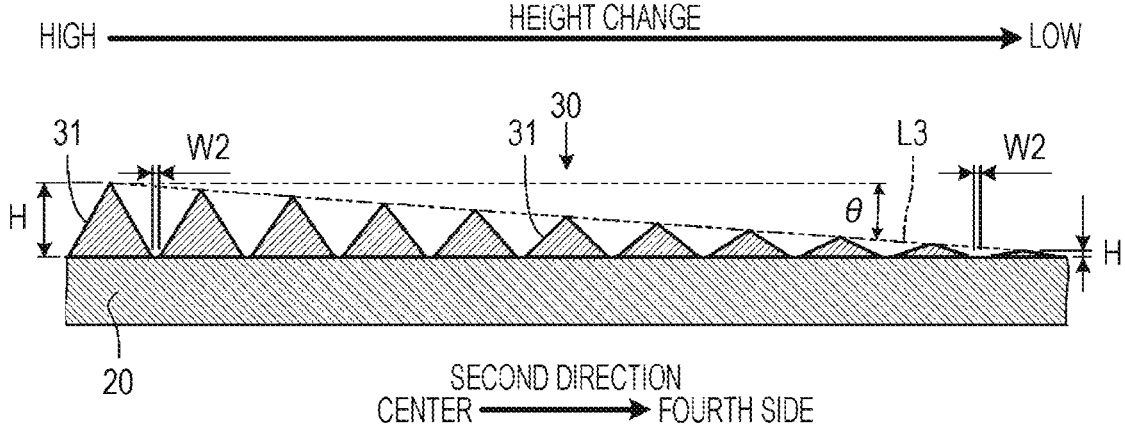

In the first pattern 30, the plurality of projections 31 is arranged in a first direction. Furthermore, in the first pattern 30, the plurality of projections 31 is arranged in a second direction. For example, in the first pattern 30 of the decorative sheet 10 indicated in FIG. 3, the plurality of projections 31 is arranged at first spacing W1 in the first direction (refer to the upper row of FIG. 4), and is arranged at second spacing W2 in the second direction (refer to the middle and lower rows of FIG. 4). More specifically, the plurality of projections 31 is arranged in the first direction in a state where two projections 31 adjacent in the first direction are apart from each other by the first distance W1. Furthermore, the plurality of projections 31 is arranged in the second direction in a state where two projections 31 adjacent in the second direction are apart from each other by the second distance W2. The projections 31 having the highest height H in the middle and lower rows of FIG. 4 are the same projection. More specifically, the projection 31 having the highest height H in each of the upper, middle and lower rows of FIG. 4 is a projection having the highest height H provided on a first side in the first direction and in the center in the second direction among the plurality of projections 31 indicated in FIG. 3.

The first and second directions are discretionary directions within the surface of the fiber base material 20. However, the second direction is a direction intersecting with the first direction. In FIG. 2, the second direction is not orthogonal to the first direction. In FIGS. 3, and 8 to 10 and 12 to 15 described below, the second direction is orthogonal to the first direction. The relationship between the first and second directions in the previously-described drawings is an illustration. The orientations of the first and second directions vary within the surface of the fiber base material 20, according to a design of the first pattern 30. In the embodiment, the first spacing W1 and the second spacing W2 are set at the same dimension. However, the first spacing W1 and the second spacing W2 may be set at different dimensions.

The point that the plurality of projections 31 includes the plurality of types of projections having different heights H is described on the basis of FIG. 4, taking the first pattern 30 of the decorative sheet 10 indicated in FIG. 3 as an example. Each height H of the plurality of projections 31 change gradually along the first direction (refer to the upper row of FIG. 4). Furthermore, each height H of the plurality of projections 31 changes gradually along the second direction (refer to the middle and lower rows of FIG. 4). More specifically, each height H of the plurality of projections 31 is gradually reduced from the first side to a second side in the first direction and is gradually reduced from the center to each of a third side and a fourth side in the second direction, all over the first pattern 30 indicated in FIGS. 3 and 4.

In the first pattern 30 indicated in FIGS. 3 and 4, each height H of the plurality of projections 31 is set as follows: more specifically, each height H of the plurality of projections 31 arranged at the first spacing W1 in the first direction is each height of the apices of the projections 31 along a virtual line L1 with a predetermined inclination (refer to the upper row of FIG. 4). Each height H of the plurality of projections 31 arranged at the second spacing W2 from the center to the third side in the second direction is each height of the apices of the projections 31 along a virtual line L2 with a predetermined inclination (refer to the middle row of FIG. 4). Each height H of the plurality of projections 31 arranged at the second spacing W2 from the center to the fourth side in the second direction is each height of the apices of the projections 31 along a virtual line L3 with a predetermined inclination (refer to the lower row of FIG. 4). A pattern where inclination angles θ of the virtual lines L1, L2, and L3 are equal is illustrated by example as the first pattern 30 indicated in FIGS. 3 and 4 (refer to FIG. 4). However, unlike such an illustration, the first pattern 30 may have a form where the inclination angle θ is different in part or all of the virtual lines L1, L2, and L3. The inclination angle θ of the plurality of projections 31 in lines in one or both of the first and second directions is set as appropriate, considering various conditions.

The second pattern 40 includes a gradation that changes successively in part or all of lightness, hue, and chroma. In the decorative sheet 10 indicated in FIG. 3, a direction in which the color changes in the gradation of the second pattern 40 is set as the first direction. However, the direction in which the color changes in the gradation of the second pattern 40 may be a different direction from one or both of the first and second directions. The gradation forming the second pattern 40 is determined as appropriate according to how the second pattern 40 is designed. The second pattern 40 is adjacent to the first pattern 30 on the first side in the first direction. More specifically, the first pattern 30 and the second pattern 40 are placed on the surface of the fiber base material 20 in a state of being adjacent to each other in the first direction.

<Evaluations of First and Second Patterns>

The inventor made the following evaluations 1 and 2 of the decorative sheet 10 of the embodiment that can obtain excellent effects described below. The inventor found, from evaluation 1, the inclination angle θ of the area where each height H of the plurality of projections 31 changes gradually in the first pattern 30 that can express a continuous change in a design with the second pattern 40. The inventor found changes in the color of the gradation of the second pattern 40, from evaluation 2. The inventor made evaluations 1 and 2 on the basis of sample 1 corresponding to the decorative sheet 10 indicated in FIG. 2.

Results obtained by evaluations 1 and 2 targeting sample 1 are described below. In such a case, a description is given, assigning the same reference numeral as the reference numeral used in the above description to each portion of sample 1 corresponding to each portion of the decorative sheet 10 of the embodiment to clarify the correspondence with the above description.

<Evaluation 1>

In evaluation 1, the inclination angle θ in the area of the first pattern 30 where each height H of the plurality of projections 31 changes gradually was obtained as targeting sample 1. The first pattern 30 of sample 1 includes the area where the heights H of each projection 31 change gradually between the projection 31 having the highest height H and the projection 31 having the lowest height H. For example, if the projection 31 having the highest height H is used as a reference, the heights H of each projection 31 between the highest projection 31 and the lowest projection 31 are gradually reduced toward the lowest projection 31.

In evaluation 1, the heights H of each of the highest and lowest projections 31 were measured according to the following method. The inclination angle θ was then obtained from equation 1 indicated below. As is clear from equation 1, the inclination angle θ corresponds to the inclination of the virtual line along each apex of the plurality of projections 31, the heights H of which change gradually.

<Projection Height Measurement Method>
Procedure 1: Cut the sample along a straight line K.
Procedure 2: Take a cut cross-sectional image of the sample with a microscope having the following configuration.
Procedure 3: Measure the heights H of each of the highest and lowest projections 31 targeting the image taken in procedure 2.

<Configuration of Microscope>
Apparatus main body: VHX-S15 made by KEYENCE Corporation
Lens: VH-Z100 made by KEYENCE Corporation
Display: VHX-200 made by KEYENCE Corporation

[Math. 1]
$$\theta = \tan^{-1}\frac{\Delta H}{G} \quad (1)$$

In the cutting in procedure 1, a cutter was used. A cutting position indicated by the straight line K (refer to FIG. 2) was set to an area along a direction intersecting with the first and second directions within the same plane. The measurement in procedure 3 was visually made using a scale. As a result of the measurement of sample 1, a difference ΔH between the heights H of each of the highest and lowest projections 31 was 94.987 μm (refer to the upper row of FIG. 5). A distance G between each of the highest and lowest projections 31 of sample 1 was 90 mm. Therefore, 0.06048° was obtained as the inclination angle θ of sample 1 from equation 1. Sample 2 in the lower row of FIG. 5 and the range of the inclination angle θ that the inventor thinks preferable are described below.

<Evaluation 2>
In evaluation 2, as in evaluation 1, an L* value, an a* value, and a b* value in an L*a*b* color system of the second pattern 40 were measured targeting sample 1. The L* value is referred to as the lightness index. The a* value and the b* value are referred to as the chromaticness indices. The a*value and the b*value correspond to chromaticity indicating hue and chroma. The a* value (+) indicates a red direction, and the a* value (−) indicates a green direction. The b* value (+) indicates a yellow direction, and the b* value (−) indicates a blue direction. The L*a*b* color system is a color display method standardized by the International Commission on Illumination (CIE 1976), and also specified in JIS (JIS Z 8781-4). Therefore, the previously-described measurement conformed to JIS Z 8781-4.

Figure 6:
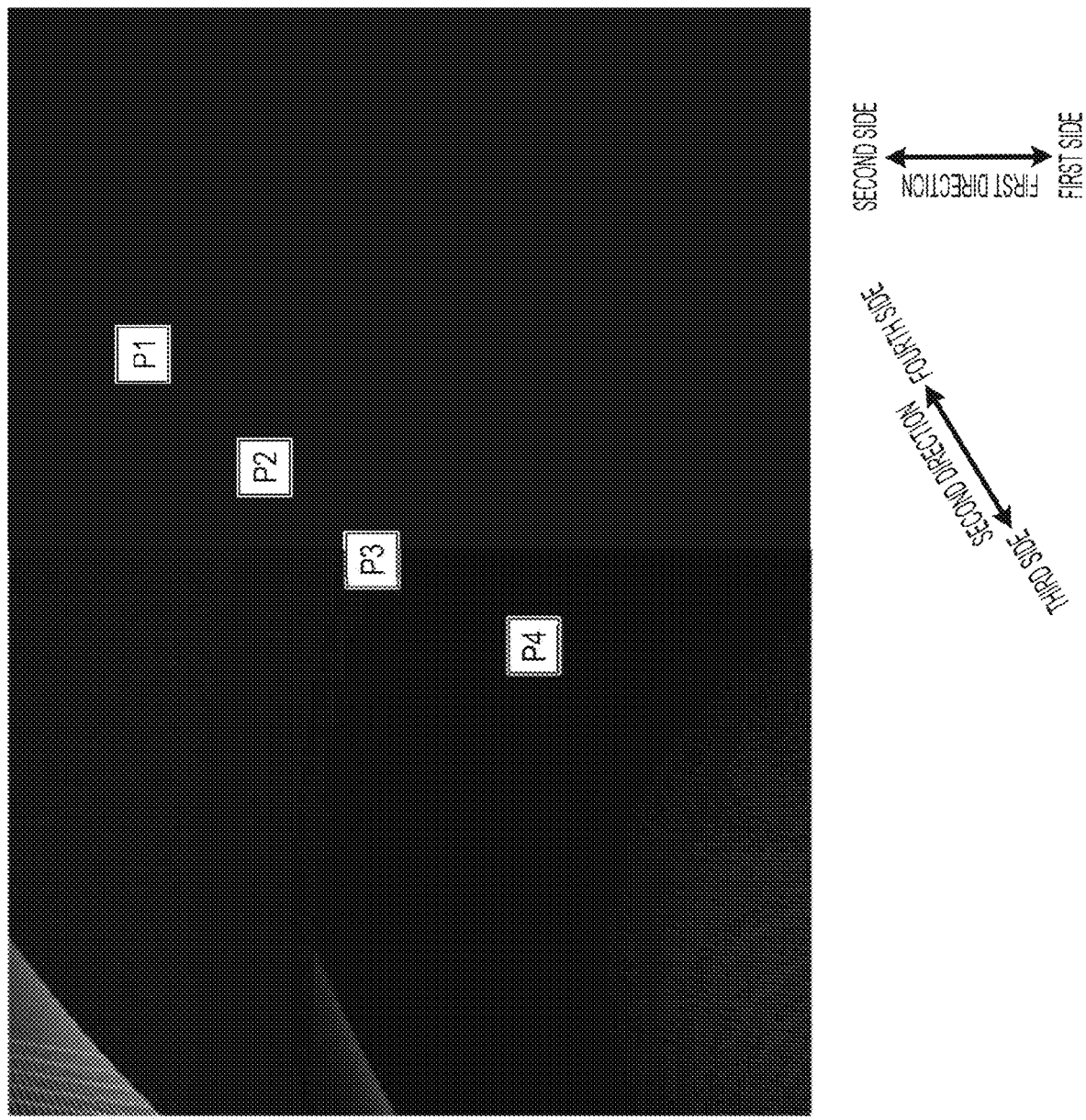
FIG. 6 is a picture indicating a part of a surface of sample 1 related to a color evaluation of a second pattern in an L*a*b* color system, the picture indicating color measurement positions in the second pattern.

The L* value, the a* value, and the b* value were measured using a spectrophotometer (CM-2500d) made by KONICA MINOLTA JAPAN, INC. D65 was used as a light source. The observation field of view was set at 10°. The measurement positions were set at four points of positions P1 to P4 of sample 1 indicated in FIG. 6. A surface area of sample 1 indicated in FIG. 6 corresponds to a part of the surface of the decorative sheet 10 indicated in FIG. 2. Lightness differences ΔL* from the positions P2, P3, and P4 were then obtained by equation 2 with reference to the L* value at the position P1. Color differences ΔE*ab from the positions P2, P3, and P4 were obtained by equation 3 with reference to the L* value, the a* value, and the b* value at the position P1. Chroma differences ΔC* from the positions P2, P3, and P4 were obtained by equation 4 with reference to the a* value and the b* value at the position P1. In equations 2 to 4, a reference numeral subscript "P1" for the L* value, the a* value, and the b* value is a reference numeral indicating that the L* value, the a* value, and the b* value at the position P1 are substituted, reference numeral subscripts "P2, P3, P4" for the L* value, the a* value, and the b* value are reference numerals indicating that the L* value, the a* value, and the b* value at each of the positions P2, P3, and P4 are substituted, respectively.

[Math. 2]
$$\Delta L^* = L^*_{P2,P3,P4} - L^*_{P1} \quad (2)$$

[Math. 3]
$$\Delta E^*ab = \sqrt{(L^*_{P2,P3,P4} - L^*_{P1})^2 + (a^*_{P2,P3,P4} - a^*_{P1})^2 + (b^*_{P2,P3,P4} - b^*_{P1})^2} \quad (3)$$

[Math. 4]
$$\Delta C^* = \sqrt{(a^*_{P2,P3,P4})^2 + (b^*_{P2,P3,P4})^2} - \sqrt{(a^*_{P1})^2 + (b^*_{P1})^2} \quad (4)$$

Table 1 indicates results obtained by the evaluation 2.

TABLE 1

|  | L* | a* | b* | ΔL* | ΔE*ab | ΔC* |
|---|---|---|---|---|---|---|
| Position P1 | 27.90 | 7.34 | 1.04 | — | — | — |
| Position P2 | 28.10 | 5.98 | 0.53 | 0.20 | 1.47 | −1.41 |
| Position P3 | 27.91 | 4.69 | 0.51 | 0.01 | 2.70 | −2.70 |
| Position P4 | 25.90 | −0.11 | −1.33 | −2.00 | 8.07 | −6.08 |

The inventor thinks the following form is preferable as the gradation of the second pattern 40, from the results indicated in table 1. More specifically, the absolute value of the lightness difference ΔL* is preferable to be two or greater. The absolute value of the color difference ΔE*ab is preferable to be eight or greater. The absolute value of the chroma difference ΔC* is preferable to be six or greater.

<Recording Method>
An overview of the recording method carried out with the inkjet recording apparatus is described. In the recording method, a predetermined type of ink is used. An active energy curable ink is illustrated by example as the ink used in the recording method. A UV curable ink and an electron beam curable ink are illustrated by example as the active energy curable ink. The active energy curable ink includes, for example, a pigment, one or both of a reactive monomer and a reactive oligomer, and a photopolymerization initiator. Furthermore, the active energy curable ink includes an additive if needed. The active energy curable ink is an ink that is already in practical use. Therefore, the other descriptions of the active energy curable ink are omitted. In the description of the recording method, the ink is the UV curable ink. In the recording method, color inks corresponding to the first pattern 30 and the second pattern 40 are used. For example, cyan, magenta, yellow, and black inks are used. Furthermore, inks of light cyan, light magenta, and light yellow being pale colors of cyan, magenta, and yellow may be used. In addition, a clear ink may be used.

The inkjet recording apparatus includes, for example, a conveyance unit, an inkjet head for each color, and an irradiation unit as in a known inkjet recording apparatus. The conveyance unit conveys the fiber base material 20 placed on a conveyance surface. The inkjet head for each color discharges an ink of its corresponding color. Ink of each color drops onto the surface of the fiber base material 20 that is being conveyed by the conveyance unit. The irradiation unit irradiates the surface of the fiber base material 20 where the ink has dropped, with UV light. The irradiation of UV light allows the ink to be cured. In the first pattern 30, the cured ink becomes the projection 31 made of resin in a state of adhering to the surface of the fiber base material 20.

The projection 31 is formed to have a predetermined height H by changing the amount of ink to form one projection 31. The height H of the projection 31 can be easily changed. The amount of ink to form one projection 31 changes depending on, for example, the number of droplets of ink that are dropped in the same position on the surface of the fiber base material 20. In addition, the amount of ink to form one projection 31 changes depending on the volume of ink discharged in one discharging operation. For example, if the projection 31 is caused to have a high height H, a plurality of ink droplets, or an ink droplet of a large volume, is dropped in a position where the projection 31 is placed. A plurality of ink droplets of a large volume may be dropped in the same position on the surface of the fiber base material 20. A known inkjet recording apparatus is employed as the inkjet recording apparatus. The previously-described ink discharging operation is also a known technology. Therefore, the other descriptions of the inkjet recording apparatus and the ink discharging operation are omitted.

The recording method includes, for example, a conveyance step, a recording step, and an irradiation step. In the conveyance step, the fiber base material 20 is conveyed. In such a case, the fiber base material 20 passes a position where the inkjet head for each color is provided. Furthermore, the fiber base material 20 passes a position where the irradiation unit is provided. The recording step and the irradiation step are executed as appropriate during execution of the conveyance step.

In the recording step, the inkjet head for each color discharges its color ink onto the fiber base material 20, as appropriate. The discharging of a color ink from the inkjet head for each color is controlled in accordance with the following image data. The previously-described image data is data corresponding to an image including the first pattern 30 and the second pattern 40. A color ink discharged from the inkjet head for each color drops onto the surface of the fiber base material 20. The first pattern 30 and the second pattern 40 are recorded accordingly onto the surface of the fiber base material 20. If the first pattern 30 is recorded, the above-described discharging operation is executed in the inkjet recording apparatus, in accordance with the height H of the projection 31. In the irradiation step, the irradiation unit irradiates the surface of the fiber base material 20 with UV light. The irradiation of UV light allows each color ink that has dropped onto the surface of the fiber base material 20 to be cured. In this manner, the decorative sheet 10 is manufactured.

The inkjet recording apparatus may be either a serial type or a line type. If the electron beam curable ink is used to record the first pattern 30 and the second pattern 40, an irradiation unit that irradiates an electron beam is provided in the inkjet recording apparatus. In the irradiation step, the irradiation unit irradiates an electron beam as in the above description. If the active energy curable ink is not used, the irradiation unit is omitted in the inkjet recording apparatus. The irradiation step is omitted in the recording method.

Advantageous Effects of Embodiment

According to the embodiment, the following advantageous effects can be obtained.

(1) In the decorative sheet 10, the first pattern 30 is formed on the surface of the fiber base material 20 (refer to FIGS. 2 and 3). The first pattern 30 is formed by the plurality of projections 31 made of resin that have adhered to the surface of the fiber base material 20. The plurality of projections 31 is arranged in the first and second directions. In the first pattern 30, the plurality of projections 31 is arranged at regular spacing in the first direction, and is arranged at regular spacing in the second direction (refer to the partial enlarged view of FIG. 2 and FIG. 4). In the first pattern 30, each height H of the plurality of projections 31 changes gradually along the first direction (refer to the partial enlarged view of FIG. 2 and the upper row of FIG. 4). In the first pattern 30, each height H of the plurality of projections 31 changes gradually along the second direction (refer to the partial enlarged view of FIG. 2 and the middle and lower rows of FIG. 4). Hence, the texture of the decorative sheet 10 can be improved. A three-dimensional effect can be added to the decorative sheet 10. It is possible to cause a viewer of the decorative sheet 10 to feel successive changes in the first pattern 30 with the sense of sight and the sense of touch. It is possible to increase the degree of freedom in a design of a product having the decorative sheet 10 as the front fabric. The decorative sheet 10 can improve the design of the product.

(2) In the decorative sheet 10, the second pattern 40 is formed on the surface of the fiber base material 20 (refer to FIGS. 2 and 3). The second pattern 40 includes a gradation that changes successively in part or all of lightness, hue, and chroma. The first pattern 30 and the second pattern 40 are placed on the surface of the fiber base material 20 in a state of being adjacent to each other in the first direction. Hence, a design variation can be increased. A three-dimensional effect can be expressed with the two different first pattern 30 and second pattern 40. It is possible to give an impression of a smooth change from the first pattern 30 to the second pattern 40 or from the second pattern 40 to the first pattern 30.

<Modifications>

The embodiment can also be configured as follows. Some configurations of modifications illustrated below may also be employed in combination as appropriate. In the following description, points different from the above description are described, and the description of similar points is omitted as appropriate.

(1) The recording method with the inkjet recording apparatus is employed to form the first pattern 30 and the second pattern 40. More specifically, the first pattern 30 and the second pattern 40 are recorded onto the surface of the fiber base material 20 with a color ink discharged from the inkjet head for each color of the inkjet recording apparatus. A recording apparatus different from the inkjet recording apparatus may be employed to form the first pattern 30 and the second pattern 40 by the recording method. The recording method may be executed with, for example, a printing apparatus. Also in the recording method with the printing apparatus, the first pattern 30 including the plurality of projections 31 (the resin portion 31) and the second pattern 40 including the gradation can be recorded onto the surface of the fiber base material 20 as in the above description. The projection 31 is formed to have a predetermined height H by changing the amount of ink, as described above.

The printing apparatus is a known recording apparatus. The recording of a pattern with the printing apparatus is already in practical use. Therefore, the other descriptions of them are omitted. In this modification, the printing indicates, for example, screen printing or roller printing. The printing in this modification does not include digital printing in the inkjet system. The digital printing in the inkjet system is included in the recoding technique in the recording step of the recording method with the inkjet recording apparatus.

(2) In the first pattern 30, the plurality of projections 31 is arranged at regular spacing in the first direction, and is arranged at regular spacing in the second direction (refer to the partial enlarged view of FIG. 2 and FIG. 4). The spacing in the first direction between the plurality of projections 31 may be set at zero. More specifically, the plurality of projections 31 may be arranged in the first direction in a state of being in contact with each other without a gap. The spacing in the second direction between the plurality of projections 31 may be set at zero. More specifically, the plurality of projections 31 may be arranged in the second direction in a state of being in contact with each other without a gap. In addition, the plurality of projections 31 may not be arranged at regular spacing in one or both of the first and second directions. More specifically, the plurality of projections 31 may be arranged at discretionary spacing in one of both of the first and second directions.

Figure 7:
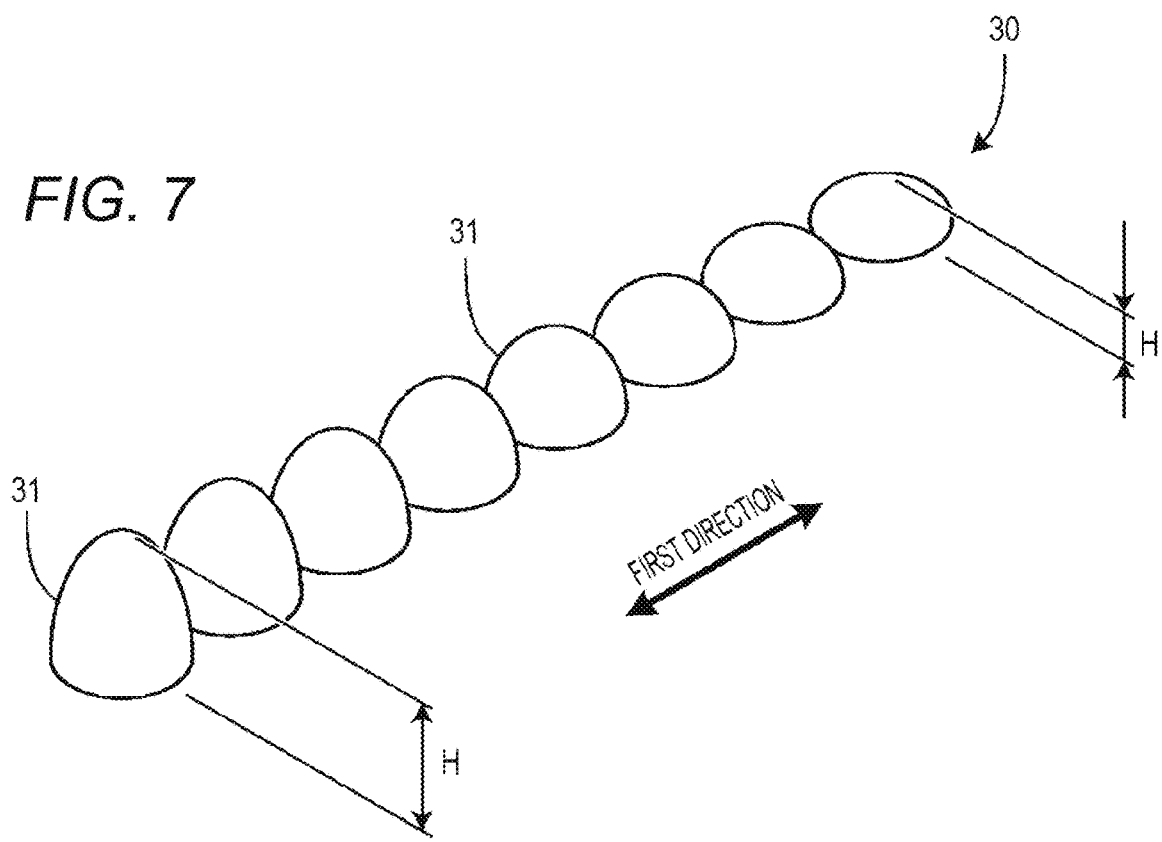
FIG. 7 is a perspective view schematically indicating a first pattern where a plurality of projections is arranged in a line.

(3) The square pyramid projection is illustrated by example as the projection 31 (refer to FIGS. 3 and 4, and FIG. 8 described below). If the projection 31 is a square pyramid, a bottom surface may have a different shape from the above shape. More specifically, the bottom surface may have any of, for example, rectangular, rhomboidal, parallelogram, and trapezoidal shapes. The projection may have a conical or frustum shape different from the square pyramid (not illustrated). If the projection has the conical or frustum shape other than the square pyramid, the bottom surface may have a regular polygonal shape, or a polygonal shape that is not a regular polygon. In addition, the projection 31 may be hemispherical (refer to FIG. 7). Furthermore, the projection 31 may have a columnar shape (refer to FIG. 9). More specifically, various projection shapes projecting from the surface of the fiber base material 20 can be employed as the projection. The shape of the projection is determined as appropriate according to how the first pattern is designed.

(4) In the first pattern 30, the plurality of projections 31 is arranged in the first and second directions (refer to the partial enlarged view of FIG. 2 and FIGS. 3 and 4). The first pattern 30 may be a pattern where the plurality of projections 31 is arranged in a line in the first direction (refer to FIG. 7).

In the first pattern 30, each height H of the plurality of projections 31 changes gradually along the first direction (refer to the partial enlarged view of FIG. 2 and the upper row of FIG. 4). In the first pattern 30, each height H of the plurality of projections 31 changes gradually along the second direction (refer to the partial enlarged view of FIG. 2 and the middle and lower rows of FIG. 4). The first pattern 30 may be a pattern where each height H of the plurality of projections 31 changes gradually along the first direction, and does not change gradually along the second direction (refer to FIG. 8). More specifically, in the first pattern 30 of the decorative sheet 10 indicated in FIG. 8, each height H of the plurality of projections 31 arranged in the first and second directions is gradually reduced from the first side to the second side in the first direction, and is the same in the second direction.

In addition, the first pattern 30 may be a pattern where the plurality of projections 31 is not arranged linearly. For example, the first pattern 30 may be a pattern where the plurality of projections 31 is placed concentrically (refer to FIG. 9). In this first pattern 30, each height H of the plurality of projections 31 changes gradually along a radial direction. More specifically, each height H of the plurality of projections 31 that are placed concentrically is gradually reduced from the center to the outer perimeter in the radial direction. In other words, each height H of the plurality of projections 31 placed on circumferences is increasingly increased toward the center in the radial direction, and the projection 31 located in the center in the radial direction is the projection having the highest height H. However, the radial direction is a direction of the two-dimensional Cartesian coordinate system or polar coordinate system. Therefore, in the decorative sheet 10 indicated in FIG. 9, the first pattern 30 can also be said to be a pattern where each height H of the plurality of projections 31 changes along at least the first direction, or can also be said to be a pattern where each height H of the plurality of projections 31 changes along the first and second directions. In the Cartesian coordinate system or the polar coordinate system, the first and second directions can also be defined as an orthogonal relationship.

Furthermore, the first pattern 30 may be a pattern where the plurality of projections 31 is placed in a state of being dispersed in a predetermined gathered area within the surface of the fiber base material 20 as in the decorative sheet 10 indicated in FIGS. 2, 3, 8, and 9. A grained pattern is illustrated by example as such a pattern. The decorative sheet 10 having a grained pattern as the first pattern 30 is described with reference to FIGS. 10, 11, and the lower row of FIG. 5. The decorative sheet 10 indicated in FIG. 10 does not include the second pattern 40.

Figure 10:
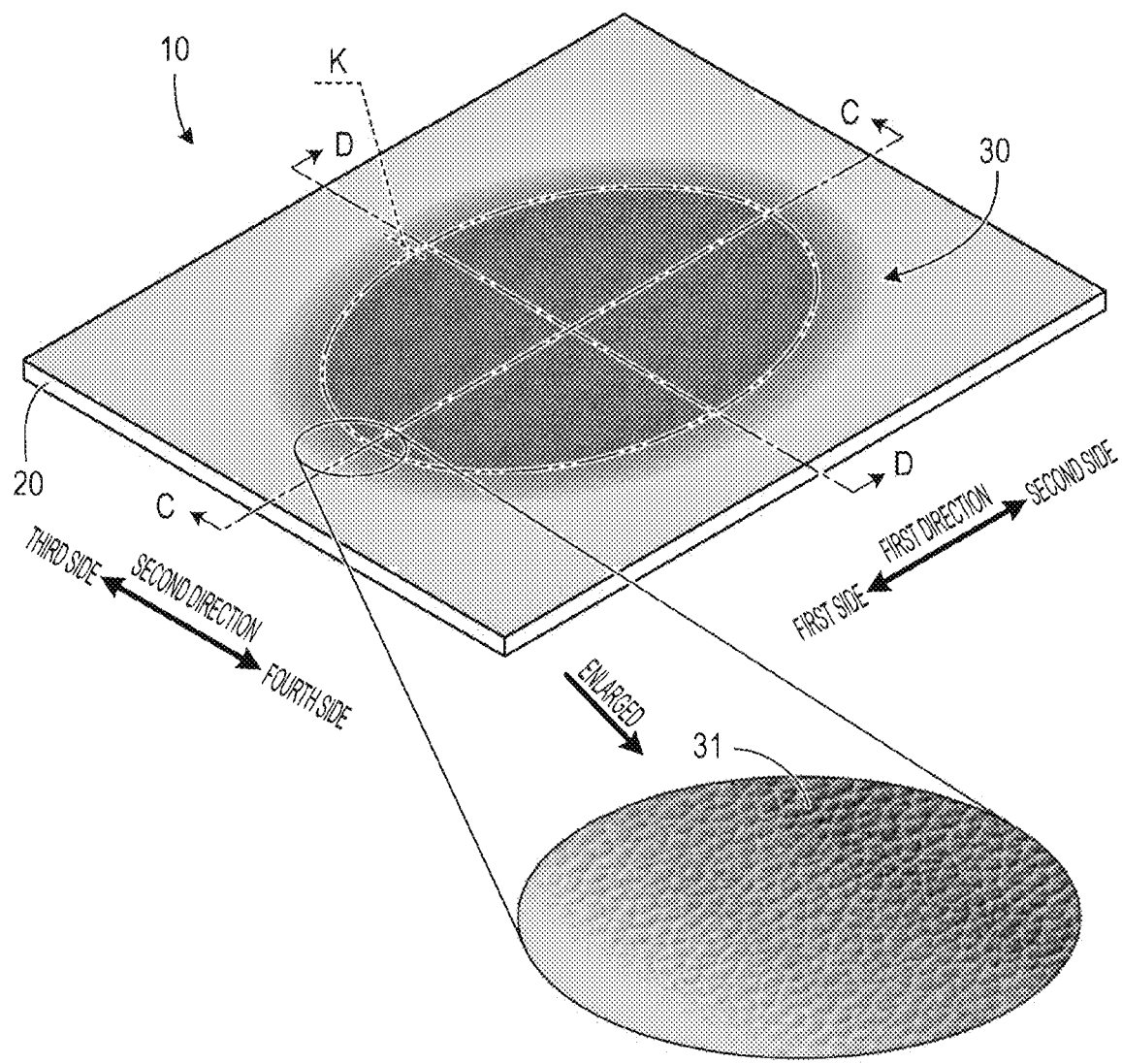
FIG. 10 is a perspective view indicating still another example of the schematic configuration of the decorative sheet, and indicates a partial enlarged view of an outer edge area of a first pattern.

In the decorative sheet 10 indicated in FIG. 10, the first pattern 30 is an elliptical pattern. Therefore, in this first pattern 30, the plurality of projections 31 is placed in an elliptical area on the fiber base material 20. If the first pattern 30 is a grained pattern, the plurality of projections 31 is formed into irregular shapes, and is irregularly placed in the previously-described elliptical area. The first pattern 30 of the decorative sheet 10 indicated in FIG. 10 is divided into an inner area and an outer edge area. A chain double-dashed line indicated in the first pattern 30 in FIG. 10 is an explanatory illustration suggesting a boundary portion between the outer edge area and the inner area of the first pattern 30. In the partial enlarged view of FIG. 10, the illustration of the previously-described chain double-dashed line is omitted. The straight line K indicated in FIG. 10 by a broken line from the vicinity of the previously-described boundary portion to the outer edge area is an explanatory illustration indicating the cutting position of sample 2 that was evaluated as in evaluation 1. A description of the evaluation is given below.

In the first pattern 30 of the decorative sheet 10 indicated in FIG. 10, each height H of the plurality of projections 31 does not change in the inner area and changes gradually along the radial direction in the outer edge area (refer to FIG. 1). More specifically, the plurality of projections 31 is projections having the similar height in the inner area. The plurality of projections 31 includes a plurality of types of projections having different heights H in the outer edge area as in the above-described decorative sheet 10 (refer to FIGS. 2, 3, 8, and 9). The radial direction is as described above. Therefore, in the decorative sheet 10 indicated in FIG. 10, the first pattern 30 can also be said to be a pattern where each height H of the plurality of projections 31 changes along at least the first direction, or can also be said to be a pattern where each height H of the plurality of projections 31 changes along the first and second directions.

Figure 11:
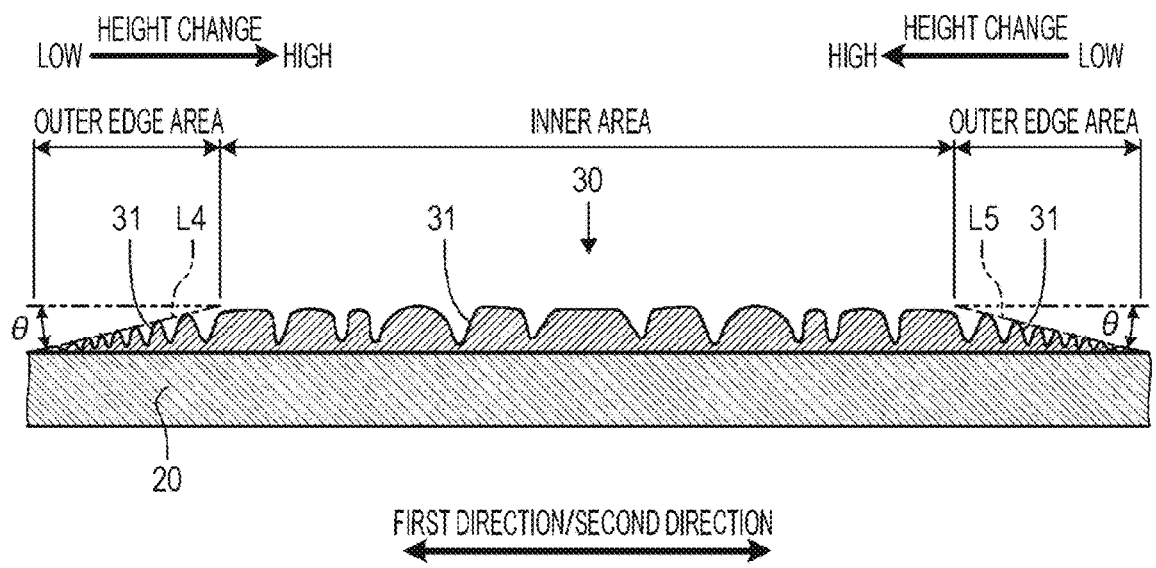
FIG. 11 is a diagram indicating the state of changing each height of the plurality of projections, and is a schematic partial cross-sectional view in a case of cutting a decorative sheet corresponding to the decorative sheet indicated in FIG. 10 in each position corresponding to a position of line C-C or line D-D indicated in FIG. 10.
Figure 12:
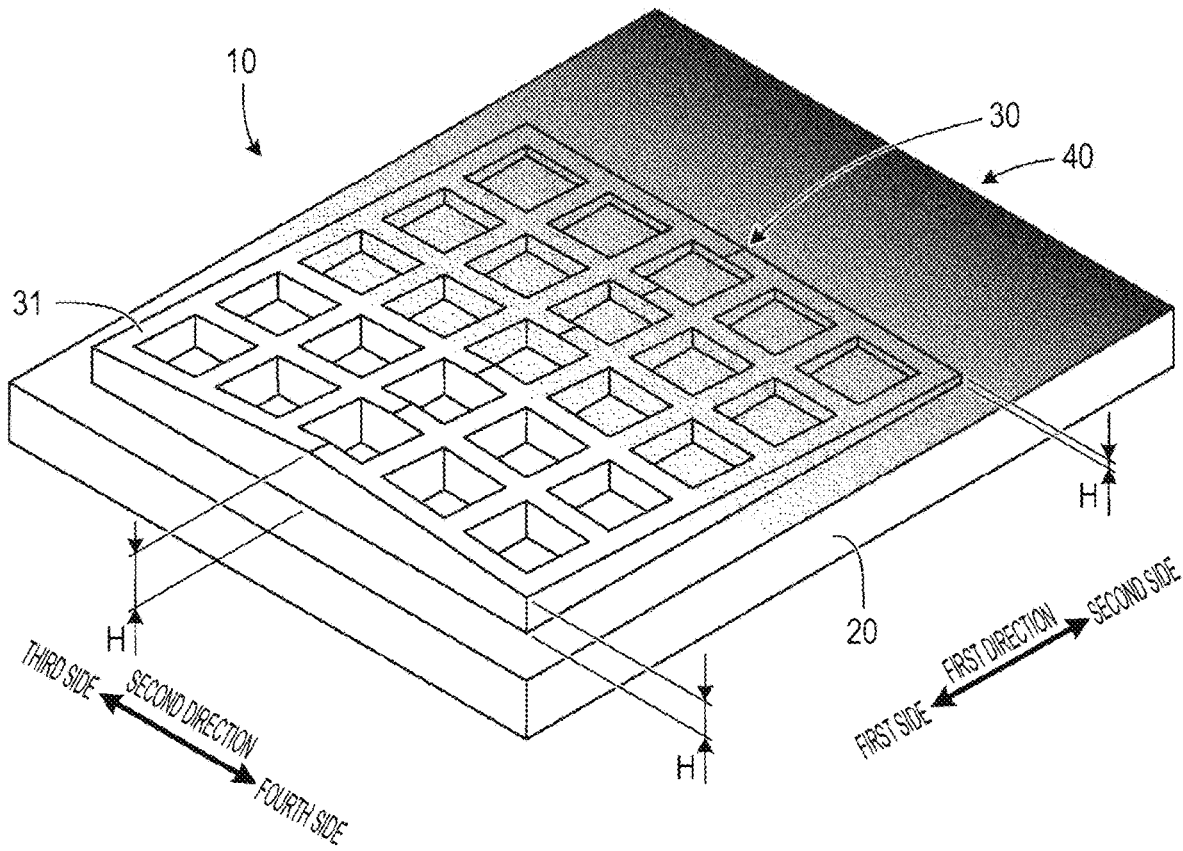
FIG. 12 is a perspective view schematically indicating still another example of a schematic configuration of a decorative sheet.
Figure 13:
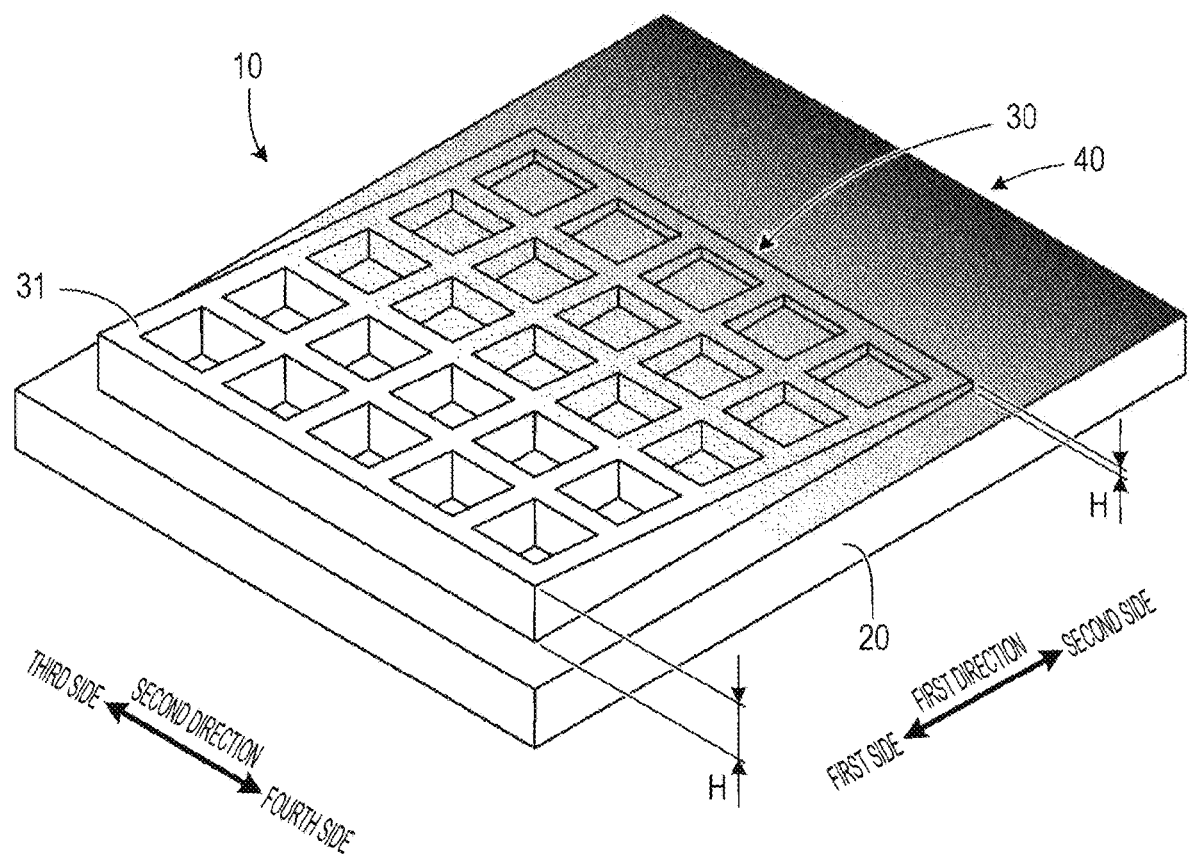
FIG. 13 is a perspective view schematically indicating still another example of a schematic configuration of a decorative sheet.
Figure 14:
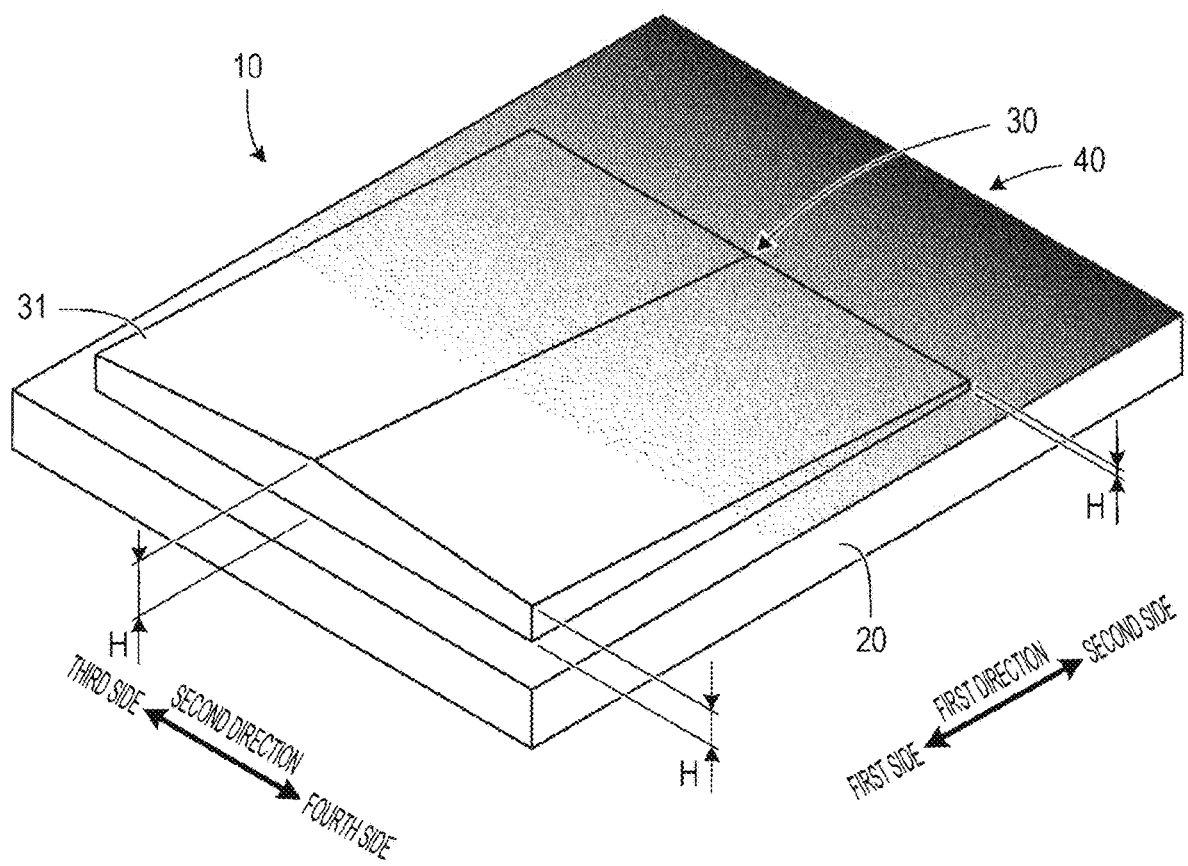
FIG. 14 is a perspective view schematically indicating still another example of a schematic configuration of a decorative sheet.
Figure 15:
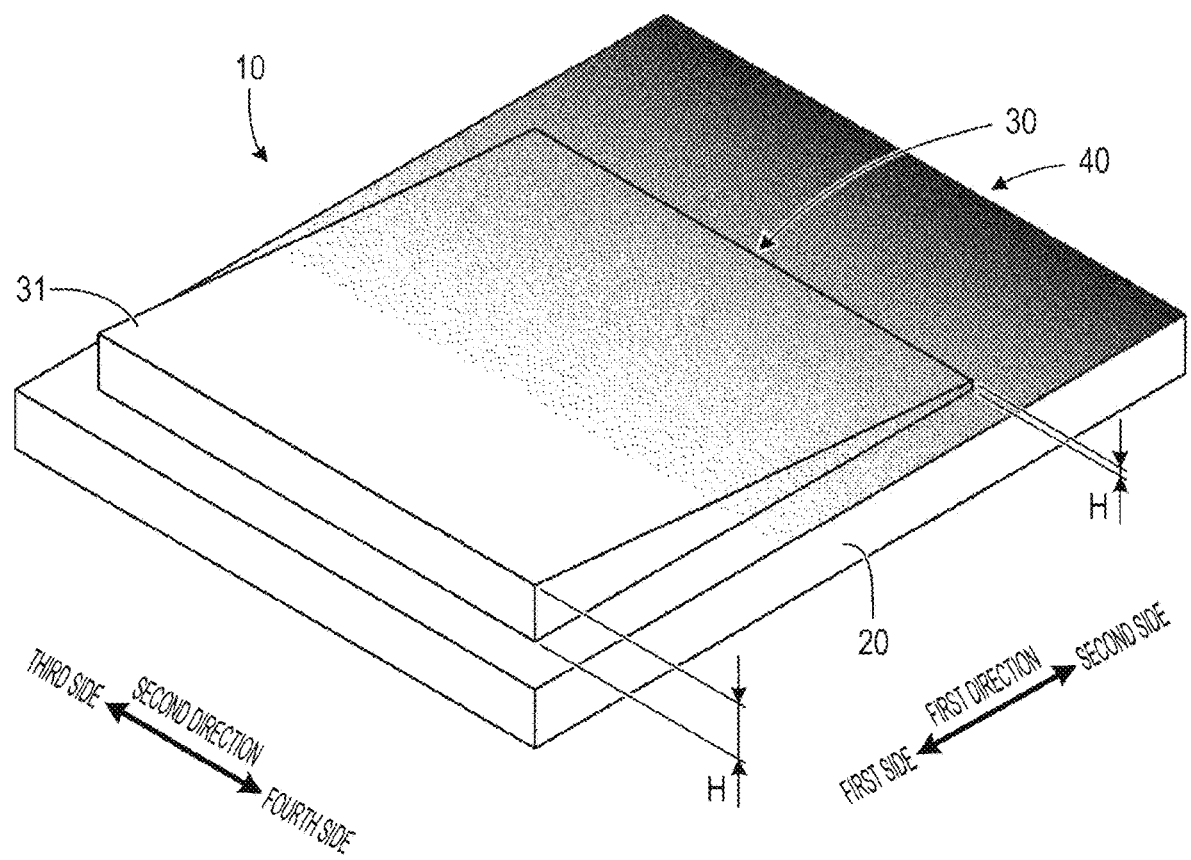
FIG. 15 is a perspective view schematically indicating still another example of a schematic configuration of a decorative sheet.

In the outer edge area of the first pattern 30, each height H of the plurality of projections 31 is heights of the apices of each of the projections 31 along a virtual line L4 or L5 with a predetermined inclination (refer to FIG. 11). A pattern where the inclination angles θ of the virtual lines L4 and L5 are equal is illustrated by example as the first pattern 30 of the decorative sheet 10 indicated in FIG. 10. However, the first pattern 30 may be a pattern where the inclination angles θ of the virtual lines IA and L5 are different. In the example indicated in FIG. 11, the first pattern 30 does not include a portion where the surface of the fiber base material 20 is exposed between two adjacent projections 31. However, also in a case where the first pattern 30 is a grained pattern or a pattern similar to the grained pattern, the first pattern 30 may be a pattern where the surface of the fiber base material 20 is exposed between two adjacent projections 31 as indicated in, for example, FIG. 4. Conversely, the above-described first pattern 30 (refer to FIGS. 2, 3, 8, and 9) may be a pattern that does not include the portion where the surface of the fiber base material 20 is exposed.

FIG. 11 is a schematic cross-sectional view corresponding to a case where the decorative sheet 10 indicated in FIG. 10 is cut in a position corresponding to a position of line C-C or line D-D indicated in FIG. 10, as described above. In other words, in FIG. 11, an accurate identity with the decorative sheet 10 indicated in FIG. 10 is not considered. More specifically, FIG. 11 is a cross-sectional view corresponding to the cross-sectional view taken along line C-C or line D-D of the decorative sheet 10 indicated in FIG. 10, but is not a cross-sectional view that matches them.

Such excellent effects as described above of the decorative sheet 10 indicated in FIG. 10 can also be obtained as in the decorative sheet 10 indicated in FIGS. 2 and 3. Hence, the inventor made a similar evaluation to evaluation 1 described above, targeting sample 2 corresponding to the decorative sheet 10 indicated in FIG. 10. Consequently, the inclination angle θ of the area where each height H of the plurality of projections 31 changes gradually in the first pattern 30 that can express successive changes in a design by itself was found. In procedure 1 of the above-described measurement method, sample 2 was cut in the position of the straight line K indicated in FIG. 10, and an image of this cut cross section was taken in procedure 2. In addition, the inventor made this evaluation in the same method as the above-described evaluation 1. Therefore, the other descriptions of the measurement method of this evaluation are omitted.

Figure 5:
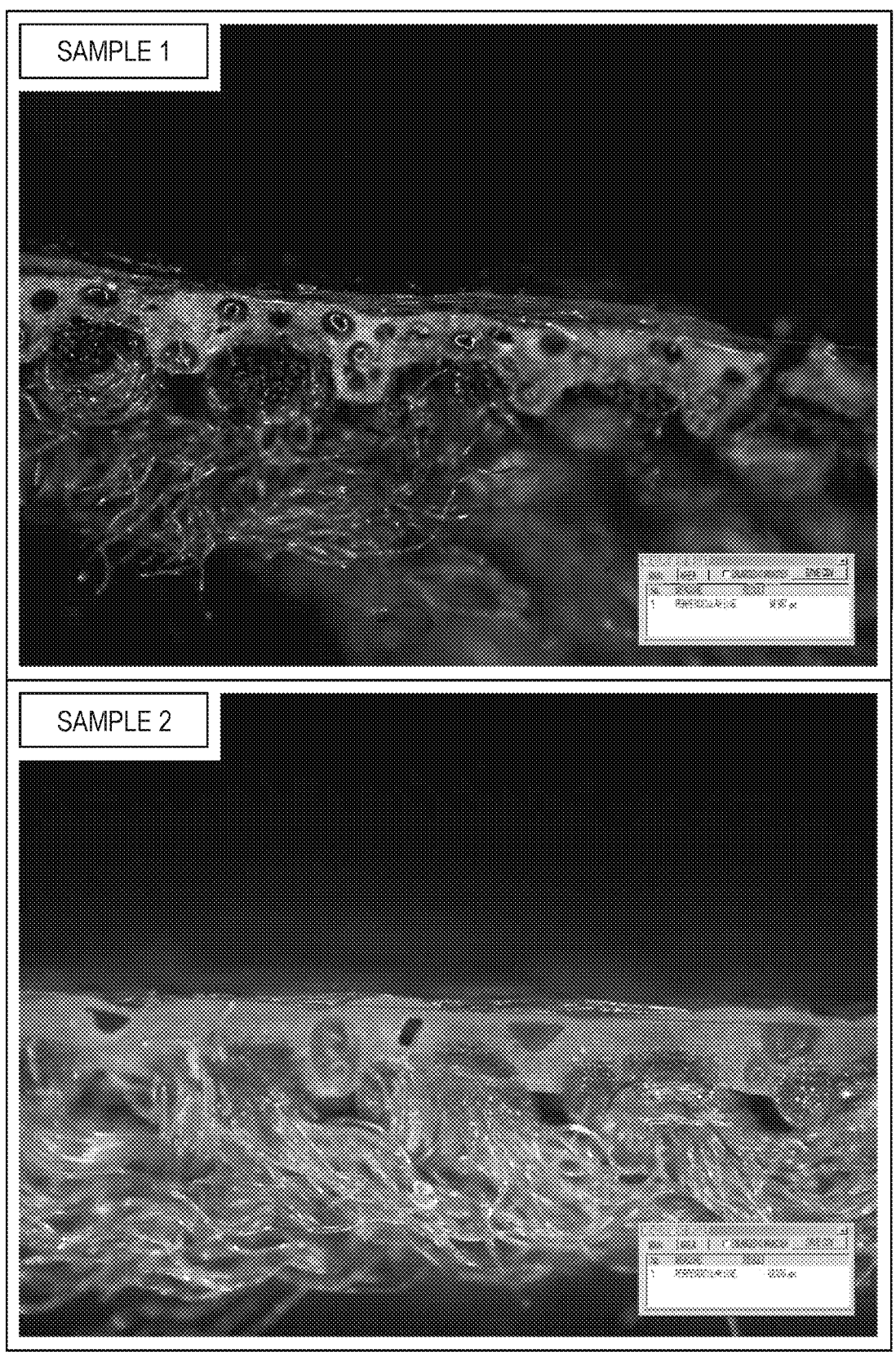
FIG. 5 is pictures of partial cross sections of samples 1 and 2 related to evaluations of an inclination angle, in which samples 1 and 2 indicate a part of a measurement target area, the upper row indicates a cross section of sample 1 corresponding to the decorative sheet indicated in FIG. 2, and the lower row indicates a cross section of sample 2 corresponding to a decorative sheet indicated in FIG. 10.

As a result of the measurement in procedure 3 of the measurement method, the difference ΔH between the heights H of each of the highest and lowest projections 31 of sample 2 was 62.235 μm (refer to the lower row of FIG. 5). The distance G between each of the highest and lowest projections 31 of sample 2 was 70 mm. Therefore, 0.05075° was obtained as the inclination angle θ of sample 2 from equation 1 described above. From the results of the evaluation targeting samples 1 and 2, the inventor thinks of a preferable range of the inclination angle θ based on the viewpoint of the continuity of designs as follows: more specifically, the inventor thinks that a predetermined range including at least "0.05075°≤inclination angle θ≤0.06048°" is the preferable range of the inclination angle θ.

(5) In the decorative sheet 10, the first pattern 30 and the second pattern 40 are formed on the surface of the fiber base material 20 (refer to FIGS. 2 and 3). The first pattern 30 and the second pattern 40 are placed on the surface of the fiber base material 20 in the state of being adjacent to each other. In the decorative sheet 10, the first pattern 30 and the second pattern 40 may be placed on the surface of the fiber base material 20 in a state of overlapping with each other (refer to FIGS. 8 and 9). The two different first pattern 30 and second pattern 40 can express a three-dimensional effect. It becomes possible to enhance the three-dimensional effect. An area where the first pattern 30 and the second pattern 40 overlap with each other may be a part of the first pattern 30 and a part of the second pattern 40 (refer to FIG. 8). In this case, the first pattern 30 and the second pattern 40 overlap with each other in a portion where the first pattern 30 and the second pattern 40 are continuous. It is possible to give an impression of a smooth change from the first pattern 30 to the second pattern 40 or from the second pattern 40 to the first pattern 30. In the decorative sheet 10 indicated in FIG. 9, the entire first pattern 30 overlaps with the second pattern 40. A composite pattern of the first pattern 30 and the second pattern 40 can be obtained. It becomes possible to enhance the three-dimensional effect.

If the first pattern 30 and the second pattern 40 are brought into the state of overlapping with each other, the overlapping order of the first pattern 30 and the second pattern 40 is determined as appropriate considering various conditions. The decorative sheet 10 indicated in FIG. 8 is configured in such a manner that the first pattern 30 is on the back side, and the second pattern 40 is on the front side. In this case, surfaces of some of the plurality of projections 31 are in a state where some of the projections 31 are patterned with a gradation of the second pattern 40. The decorative sheet 10 indicated in FIG. 9 is configured in such a manner that the first pattern 30 is on the front side, and the second pattern 40 is on the back side. In this case, the plurality of projections 31 may be made of a clear resin material. In the decorative sheet 10 where the first pattern 30 and the second pattern 40 are provided on the surface of the fiber base material 20, the previously-described front side is the front surface side of the decorative sheet 10, and the back side is the front surface side of the fiber base material 20.

The decorative sheet may be provided with a plurality of the first patterns 30. The decorative sheet may be provided with a plurality of the second patterns 40. If the plurality of the second patterns 40 is provided, one of the plurality of the second patterns 40 may be placed on the surface of the fiber base material 20 in a state of being adjacent to the first pattern 30. Furthermore, another one of the plurality of the second patterns 40 may be placed on the surface of the fiber base material 20 in a state of overlapping with the first pattern 30. In addition, the second pattern 40 may be omitted (refer to FIG. 10). In this case, the surface of the fiber base material 20 is decorated with the first pattern 30. The decorative sheet may include the first pattern 30 and a third pattern as patterns that decorate the surface of the fiber base material 20. The third pattern may include various patterns without a gradation. The third pattern may be appropriately placed in each position similar to the second pattern 40, with respect to the first pattern 30, on the surface of the fiber base material 20. Furthermore, the decorative sheet may include the first pattern 30, the second pattern 40, and the previously-described third pattern as patterns that decorate the surface of the fiber base material 20. The second pattern 40 and the third pattern may be appropriately placed in each of predetermined positions, with respect to the first pattern 30, on the surface of the fiber base material 20.

(6) The first pattern 30 includes the plurality of projections 31 as the resin portion 31 (refer to FIGS. 2, 3, and 8 to 10). The resin portion 31 of the first pattern 30 may be configured to be made of resin without the plurality of projections 31. For example, the first pattern 30 may be formed by such an integral resin portion 31 as illustrated in FIGS. 12 to 15 without the plurality of projections 31. In the decorative sheet 10 indicated in FIGS. 12 and 13, the first pattern 30 is formed by the lattice resin portion 31. In the decorative sheet 10 indicated in FIGS. 14 and 15, the first pattern 30 is formed with the resin portion 31 including one or more inclined planes. In the first pattern 30 indicated in FIGS. 12 and 14, the height H of the resin portion 31 from the surface of the fiber base material 20 changes gradually along the first and second directions on the surface of the fiber base material 20. In the first pattern 30 indicated in FIGS. 13 and 15, the height H of the resin portion 31 from the surface of the fiber base material 20 changes gradually along the first direction, and does not change gradually along the second direction, on the surface of the fiber base material 20. The shape of the surface of the resin portion 31 without the plurality of projections 31 may be a curved surface. The previously-described curved surface may be any of a concave curved surface or a convex curved surface.

Figure 8:
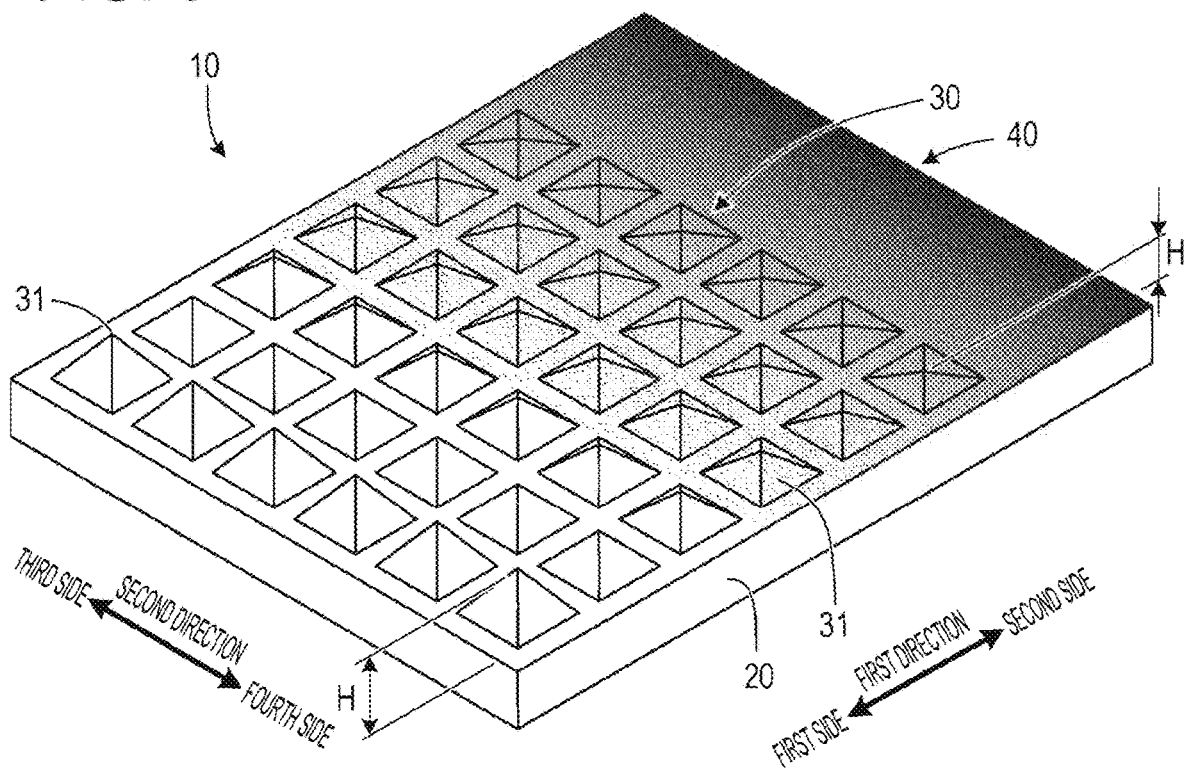
FIG. 8 is a perspective view schematically indicating still another example of a schematic configuration of a decorative sheet.
Figure 9:
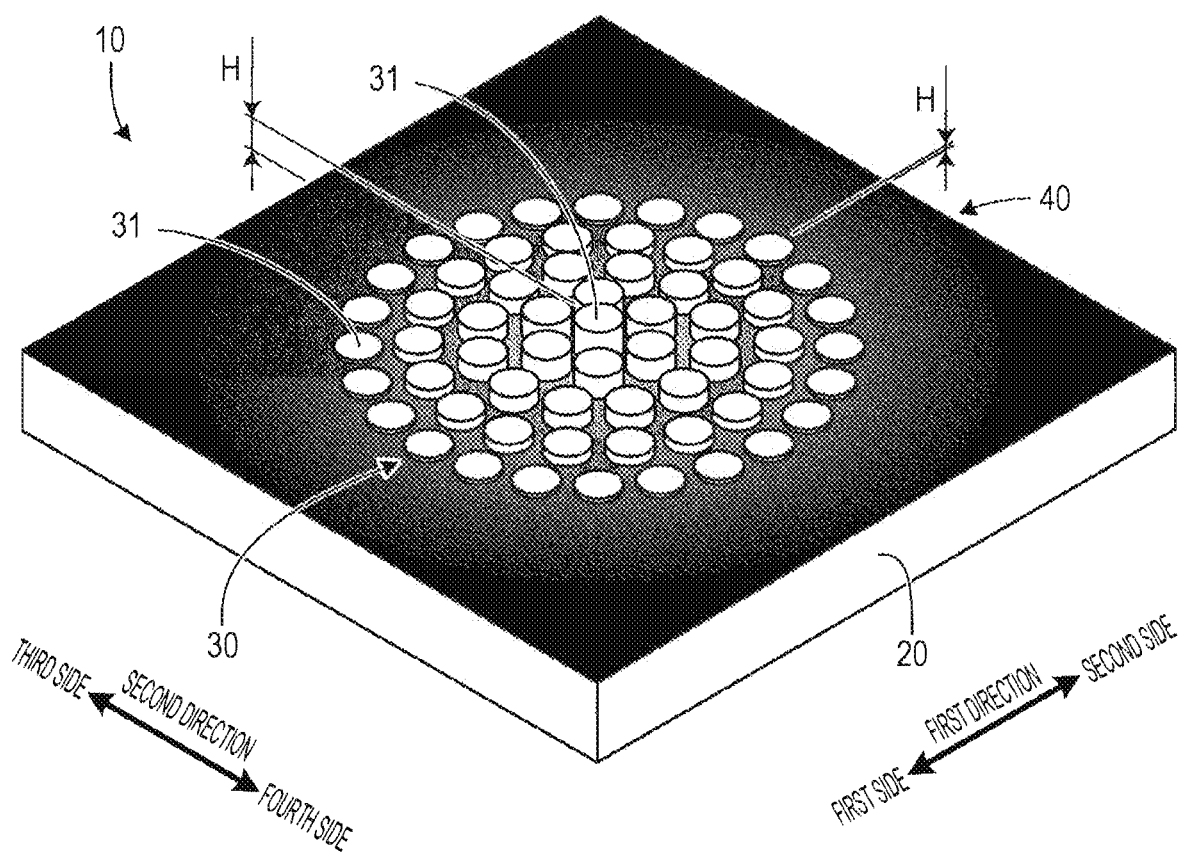
FIG. 9 is a perspective view schematically indicating still another example of a schematic configuration of a decorative sheet.

In the decorative sheet 10 indicated in FIGS. 12 to 15, the first pattern 30 and the second pattern 40 are configured to be placed in an overlapping order as in the above-described decorative sheet 10 indicated in FIG. 8. However, also if the first pattern 30 is formed by the resin portion 31 without the plurality of projections 31, the first pattern 30 and the second pattern 40 may be configured in such a manner as to overlap with each other in such a state as indicated in FIG. 9. In addition, the first pattern 30 and the second pattern 40 may be placed on the surface of the fiber base material 20, for example, in a state of being adjacent to each other as in the decorative sheet 10 indicated in FIGS. 2 and 3. The placement of the first pattern 30 and the second pattern 40 is determined as appropriate considering various conditions. The overlapping order of the first pattern 30 and the second pattern 40 is determined as appropriate considering various conditions. For example, a design required for the decorative sheet 10 is considered to determine one or both of the previously-described placement and overlapping order.

(7) In the first pattern 30, the height H of the resin portion 31 (the plurality of projections 31) changes gradually along the first direction or along the first and second directions (refer to the partial enlarged view of FIG. 2, FIG. 4, FIGS. 7 to 9, the partial enlarged view of FIG. 10, and FIGS. 12 to 15). In the first pattern, the height of the resin portion (the plurality of projections) may not change gradually. For example, the first pattern may have a form where the area is included in which the height of the resin portion (the plurality of projections) is gradually reduced from the first side to the second side in the first direction, but the height of the resin portion (the plurality of projections) is increased once in predetermined middle position or area between the first side and the second side. The form of changes in the height of the resin portion (the plurality of projections) of the first pattern is determined as appropriate according to how the first pattern is designed.

(8) The decorative sheet 10 includes the fiber base material 20, and the first pattern 30 and the second pattern 40 are formed on the surface of the fiber base material 20 (refer to FIGS. 2, 3, 8 to 10, and 12 to 15). The fiber base material of the decorative sheet may be configured in such a manner as to join a first fiber base material and a second fiber base material. In this case, in the decorative sheet, the first pattern 30 may be formed on a surface of the first fiber base material. The second pattern 40 may be formed on a surface of the second fiber base material. The first and second fiber base materials are joined by, for example, sewing. However, the first and second fiber base materials may be joined by a method different from sewing. The first and second fiber base materials are joined in a state where the first pattern 30 and the second pattern 40 are placed as described above.

(9) According to the above-described embodiment, for example, the following seat can also be specified. More specifically, a seat where a first pattern and a second pattern are formed on a surface of a fiber base material in a state of being as a product can also be specified (refer to FIG. 1). The seat includes the fiber base material, the first pattern, and the second pattern. The fiber base material is a fibrous base material as in the above fiber base material 20. The fiber base material may be a sheet-shaped base material whose surface is covered with synthetic resin. The seat may be formed by a plurality of the fiber base materials. The first pattern decorates the surface of the fiber base material and includes a resin portion made of resin as in the above first pattern 30. The resin portion adheres to the surface of the fiber base material as in the above resin portion 31. The resin portion may include a plurality of projections made of rein as in the above resin portion 31. In this case, the plurality of projections adheres to the surface of the fiber base material as in the above plurality of projections 31. In the first pattern, the height of the resin portion (the plurality of projections) from the surface of the fiber base material changes on the surface of the fiber base material. The second pattern decorates the surface of the fiber base material and includes a gradation that changes successively in part or all of lightness, hue, and chroma as in the above second pattern 40.

The first and second patterns on this seat are placed as appropriate in a similar state to the first pattern 30 and the second pattern 40 of the above-described decorative sheet 10. For example, the first and second patterns on the seat are placed in a state of being adjacent to each other. A direction which the first and second patterns are adjacent to each other may be set to a direction in which the height of the resin portion (the plurality of projections) of the first pattern changes. However, the first and second patterns on the seat may also be placed in a state of overlapping with each other. In this case, the overlapping order is set as in the above description. If the seat is formed by a plurality of the fiber base materials, the first and second patterns may also be formed on a surface of the same fiber base material, or formed on surfaces of different fiber base materials, respectively.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A decorative sheet comprising:
a fiber base material; and
a first pattern decorating a surface of the fiber base material, wherein
the first pattern is formed by a resin portion made of resin adhering to the surface of the fiber base material, and
in the first pattern, a height of the resin portion from the surface of the fiber base material changes on the surface of the fiber base material.

2. The decorative sheet according to claim 1, wherein
in the first pattern, the height of the resin portion changes along a discretionary first direction within the surface of the fiber base material.

3. The decorative sheet according to claim 2, wherein
in the first pattern, the height of the resin portion changes gradually along the first direction.

4. The decorative sheet according to claim 2, wherein
in the first pattern, the height of the resin portion changes along a second direction within the surface of the fiber base material intersecting with the first direction.

5. The decorative sheet according to claim 3, wherein
in the first pattern, the height of the resin portion changes along a second direction within the surface of the fiber base material intersecting with the first direction.

6. The decorative sheet according to claim 4, wherein
in the first pattern, the height of the resin portion changes gradually along the second direction.

7. The decorative sheet according to claim 5, wherein
in the first pattern, the height of the resin portion changes gradually along the second direction.

8. The decorative sheet according to claim 1, wherein
the resin portion includes a plurality of projections made of the resin,
the first pattern is formed by the plurality of projections adhering to the surface of the fiber base material, and
the plurality of projections includes a plurality of types of projections having different heights from the surface of the fiber base material.

9. The decorative sheet according to claim 2, wherein
the resin portion includes a plurality of projections made of the resin,
the first pattern is formed by the plurality of projections adhering to the surface of the fiber base material, and
the plurality of projections includes a plurality of types of projections having different heights from the surface of the fiber base material.

10. The decorative sheet according to claim 8, wherein
in the first pattern, the plurality of projections is arranged in a discretionary first direction within the surface of the fiber base material.

11. The decorative sheet according to claim 9, wherein
in the first pattern, the plurality of projections is arranged in a discretionary first direction within the surface of the fiber base material.

12. The decorative sheet according to claim 10, wherein
in the first pattern, the plurality of projections is arranged at first spacing in the first direction.

13. The decorative sheet according to claim 11, wherein
in the first pattern, the plurality of projections is arranged at first spacing in the first direction.

14. The decorative sheet according to claim 10, wherein
in the first pattern, the plurality of projections is arranged in a second direction within the surface of the fiber base material intersecting with the first direction.

15. The decorative sheet according to claim 14, wherein
in the first pattern, the plurality of projections is arranged at second spacing in the second direction.

16. The decorative sheet according to claim 1, further comprising a second pattern decorating the surface of the fiber base material, wherein
the second pattern includes a gradation that changes successively in part or all of lightness, hue, and chroma.

17. The decorative sheet according to claim 16, wherein
the first pattern and the second pattern are placed on the surface of the fiber base material in a state of being adjacent to each other.

18. The decorative sheet according to claim 16, wherein
the first pattern and the second pattern are placed on the surface of the fiber base material in a state of overlapping with each other.

19. A seat comprising the decorative sheet according to claim 1 as a front fabric.

20. A seat comprising:
a fiber base material;
a first pattern decorating a surface of the fiber base material; and
a second pattern decorating the surface of the fiber base material, wherein
the first pattern is formed by a resin portion made of resin adhering to the surface of the fiber base material,
the second pattern includes a gradation that changes successively in part or all of lightness, hue, and chroma, and
in the first pattern, a height of the resin portion from the surface of the fiber base material changes on the surface of the fiber base material.

* * * * *